(12) United States Patent
Bronheim et al.

(10) Patent No.: US 10,678,558 B2
(45) Date of Patent: Jun. 9, 2020

(54) INITIALIZING A BARE-METAL HOST TO AN OPERATIONAL HYPERVISOR

(71) Applicant: Red Hat Israel, Inc., Raanana (IL)

(72) Inventors: Yaniv Bronheim, Raanana (IL); Oved Ourfalli, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/624,035

(22) Filed: Feb. 17, 2015

(65) Prior Publication Data

US 2016/0239316 A1 Aug. 18, 2016

(51) Int. Cl.
*G06F 9/445* (2018.01)
*G06F 9/455* (2018.01)

(52) U.S. Cl.
CPC ...... *G06F 9/44505* (2013.01); *G06F 9/45558* (2013.01); *G06F 2009/45575* (2013.01)

(58) Field of Classification Search
CPC ............. G06F 9/44505; G06F 9/45558; G06F 2009/45575
See application file for complete search history.

(56) References Cited

U.S. PATENT DOCUMENTS

| | | | |
|---|---|---|---|
| 7,577,722 B1 * | 8/2009 | Khandekar | G06F 9/45558 709/220 |
| 8,332,490 B2 | 12/2012 | Bozek et al. | |
| 8,352,608 B1 * | 1/2013 | Keagy | G06F 8/63 709/220 |
| 2010/0049838 A1 | 2/2010 | Dehaan | |
| 2012/0297179 A1 * | 11/2012 | Lirbank | G06F 9/45558 713/2 |
| 2013/0139153 A1 * | 5/2013 | Shah | G06F 9/45558 718/1 |
| 2013/0151317 A1 | 6/2013 | Charfi et al. | |
| 2013/0152080 A1 | 6/2013 | Sachindran et al. | |
| 2014/0280975 A1 | 9/2014 | Mordani et al. | |

OTHER PUBLICATIONS

"Plug-in for Virtualization Server Provisioning User Guide", https://h20565.www2.hp.com/hpsc/doc/public/display?docId=emr_na-c04042678-1&docLocale=en_US; HP P9000 Command View Advanced Edition Suite Software; Nov. 2011, 46 pages.
"Auto Deploy Plug-In"; http://blogs.vmware.com/orchestrator/2012/01/auto-deploy-plug-in.html, VWare VCenter Orchestrator Blog; Jan. 12, 2012, 8 pages.

(Continued)

*Primary Examiner* — Brian W Wathen
*Assistant Examiner* — Carina Yun
(74) *Attorney, Agent, or Firm* — Lowenstein Sandler LLP

(57) ABSTRACT

Implementation for initializing a bare metal host to an operational hypervisor is disclosed. A method of the disclosure includes detecting, by a processing device, an application programming interface request (API) request to initiate configuration of a host operating system (OS) on a host. The method also includes receiving, by the processing device, from a virtualization management system, a request to install the host to a hypervisor with a defined configuration. The method further includes providing, by the processing device, a status of a configuration of the host to the virtualization management system in view of the defined configuration.

20 Claims, 4 Drawing Sheets

(56) References Cited

OTHER PUBLICATIONS

"Auto Deploy"; http://www.vmware.com/products/vsphere/features/auto-deploy; VMware, Inc., 2014, 1 page.

"Implementing VMware vSphere 5 Auto Deploy on the Cisco Unified Computing System"; http://www.cisco.com/c/en/us/solutions/collateral/data-center-virtualization/unified-computing/whitepaper_c11-701953.htmlCisco 2012, White Paper, 14 pages.

"VMware vCenter Orchestrator Plug-In for vSphere Auto Deploy 5.5.1 Release Notes"; https://www.vmware.com/support/orchestrator/doc/auto-deploy-plugin-551-release-notes.html; VMware vCenter Orchestrator 5.5.1, Mar. 11, 2014, 1 page.

\* cited by examiner

INITIALIZING A BARE-METAL HOST TO AN OPERATIONAL HYPERVISOR

TECHNICAL FIELD

The implementations of the disclosure relate generally to a bare-metal host systems and, more specifically, relate to initializing a bare-metal host to an operational hypervisor that creates and runs the virtual machines.

BACKGROUND

A virtual machine (VM) is a portion of software that when executed on appropriate hardware, creates an environment allowing the virtualization of an actual physical computer system (e.g., an application server, a a web server, etc.). The actual physical computer system is typically referred to as a "bare metal host" or "host," "server" or "host machine" and the operating system of the host is typically referred to as the "host operating system."

A virtual machine may function as a self-contained platform, executing its own "guest" operating system and software applications. As known in the art "guest" is another term for the virtual machine. Typically, software on the host known as a "hypervisor" (or a "virtual machine monitor" or "virtualization desktop system manager"), which is a server itself is initialized to create and run virtual machines as process on it and further manage the virtual machines. Such management includes but is not limited to, memory management, storage manipulation, quality of service, device control etc.

A management system (e.g., a host controller, manager, or engine) may function to install the packages required for the hypervisor and configure network and storage aspects and further configure the OS on the host. Upon configuration of the OS on the host, a virtual management system may function to install the hypervisor onto the host to create and run one or more VMs.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
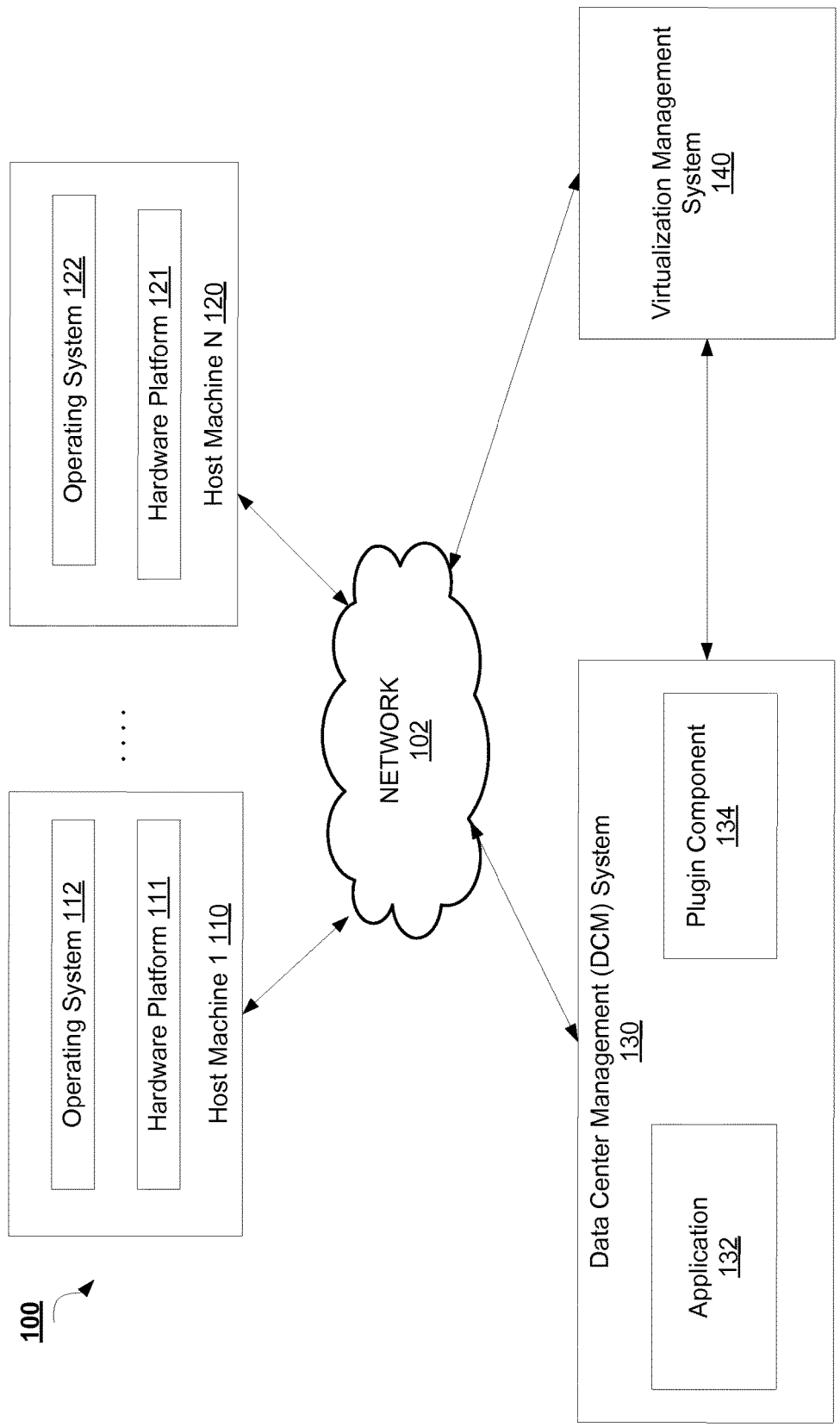
FIG. 1 is a block diagram of a network architecture in which implementations of the disclosure may operate.

Implementations of the disclosure provide for initializing a host machine to an operational hypervisor that creates and runs the virtual machines (VMs). In one implementation, a a data center management system places the host machine (also referred to as "host") in a state that allows the host to be managed by a virtualization management system. A virtualization management system may install a hypervisor that would create and run a virtual machine that acts like a real computer with an operating system. A plugin component may run on the data center management system that runs applications on the host. A data center management system installs and manages host operating system (OS) on the host machine.

In one implementation, the plugin component provides for an installation status and a configuration status of the host OS to the virtualization management system. Upon receipt of the installation status, the virtualization management system manages the host OS by preparing to initiate virtualization in the host. In one implementation, the plugin component provides the configuration status of the host OS to the virtualization management system. Upon receipt of the configuration status, the virtualization management system manages the host by starting and configuring virtualization in the host after completion of a provision phase in the host. The provision phase includes but is not limited to installing OS and configure OS such as services, keys, user, network devices on the host.

In previous implementations of initializing a host machine to an operational hypervisor, a user would provision the server (installing OS) manually or uses the data center management system. Only after the network is configured properly (e.g. an ip address to the host is ready and reachable), the user could use the virtualization management system to deploy it as an hypervisor and then run and manage virtual machines Implementations of the disclosure improve the data center management system by allowing to place the host in a state that allows the host to be managed directly by the virtualization management system. Specifically, the data center management system includes a plugin component that provides for a correlation between the data center management system and a virtualization management system by initializing the host to an operational hypervisor. Such correlation may be established by a detection of a request to initiate a configuration of a host OS and monitor for a status of the configuration of the host OS based on the defined set of configurations provided by the virtualization management system. In one implementation, the status includes accurate and complete configuration of the host OS as per the defined set of configurations. Furthermore, the plugin component informs the virtualization management system of the accurate and complete configuration of the host OS. Accordingly, in the implementation of the present invention, the plugin component of the data center management system uses an application programming interface (API) of the virtualization management system to deploy the requirements on the host that got provisioned. The accurate and complete configuration of the host OS indicates that the host is ready for virtualization, which results in automatic start of the deploy for hypervisor by the virtualization management system.

FIG. 1 is a block diagram of a network architecture 100 in which implementations of the disclosure may operate. The network architecture 100 includes, but is not limited to, one or more host machines 110, 120 (also referred to as hosts 110, 120) or a cluster of hosts 110, 120), which are physical hosts. A physical host is a hardware-computing device enabled to host services, applications, and/or other processes. Each of the hosts 110, 120 includes corresponding hardware platforms 111, 121 respectively.

Each of the hosts 110, 120 is communicatively coupled to a data center management (DCM) system 130 and a virtualization management system 140 over a network 102. The network 102 may be a private network (e.g. a local area network (LAN), a wide area network (WAN), intranet, etc.) or a public network (e.g., the Internet).

In one implementation, the DCM system 132 may include an application 132 to install and configure an operating system (OS) on each of the hosts 110, 120. This OS installed on hosts 110, 120 may be referred to herein as a host OS. In one implementation, the DCM system 130 installs a host OS 112, a host OS 122 on one or more of the hosts 110, 120. In one implementation, the DCM system 130 sends a first application programming interface (API) request to the application 132 to install the host OS 112, and host OS 122 on the hosts 110 and 120 respectively. Each of the host 110 and 120 boots up and sends its hardware information to the DCM system 130. The DCM system 130 maintains a list of these hosts 110 and 120 onto which the host OS 112 and 122 were installed. When the DCM system 130 receives the hardware information from each of the host OS 110 and 120, indicating that the host OS 112 and 122 have been completely and accurately installed on the hosts 110, 120, the DCM system 130 may then send a second API request to the application 132 to initiate configuration of files on the installed host OS 112 and 122 in the hosts 110, 120 respectively. In one implementation, the virtualization management system 140 polls the status of the installing of the host OS 112 and 122. The virtualization management system 140 may determine that the host OS 112 and 122 may not have completely and accurately installed when a status of the installing of the host OS 112 and 122 is not received for a predefined time. As such, the installation of the host OS 112 and 122 is determined to have failed.

In one implementation, the DCM system 130 includes a plugin component 134 that provides for correlation between the DCM system 130 and the virtualization management system 140. In one implementation, the plugin component 134 detects this second API request as a first attempt to provision the hosts 110, 120. Because of detecting the second API request, the plugin component 134 communicates with the virtualization management system 140. In one implementation, the plugin component 134 provides a list of the hosts 110 and 120 to the virtualization management system 140.

The virtualization management system 140 shows the list to a user. The user may select one or more of the hosts 110 and 120 and define a set of configurations for the selected hosts 110 and 120 to the virtualization management system 140. Such configuration may include but not limited to network configurations and services to be run by the selected hosts 110 and 120. The user may also provision a request to the DCM system 130 via the virtualization management system 140 to initialize the selected hosts 110 and 120 to a hypervisor with the defined set of configurations.

The DCM system 130 then sends a second request to the application 132, which begins to configure the selected hosts 110, 120 based on the defined set of configurations. Accordingly, in the implementation of the present invention, the plugin component of the data center management system uses an application programming interface (API) of the virtualization management system to deploy the requirements on the host that got provisioned. The application 132 also reports on status of the configuration of the selected hosts 110, 120 to the DCM system 130. Application 132 may report to the DCM system 130 on a continuous basis, or otherwise (e.g., interval reporting, etc.). In one implementation, the plugin component 134 monitors the status of configuration on the selected hosts 110 and 120 that are reported to the DCM system 130.

In one implementation, the virtualization management system 140 polls the status of the configuring of the selected hosts 110, 120. The virtualization management system 140 may determine that the selected hosts 110 and 120 may not have completely and accurately configured as per the set of configurations defined by the user. As such, the configurations of the of the selected hosts 110 and 120 is determined to have failed. The DCM system 130 receives a final status from the application 132 that the OS of the selected hosts 110, 120 has been completely and accurately configured as per the set of configurations defined by the user In one implementation, this final status is detected by the plugin component 134, which subsequently informs the virtualization management system 140 of the final status. The virtualization management system 140 informs the user of the final status on the configuration of the selected hosts 110, 120. At this point, the user may use the selected hosts 110 and 120 from the virtualization management system 140 to initiate virtualization in the selected hosts 110, 120. As such, the plugin component 134 places the hosts 110, 120 in a state such that the hosts 110, 120 are managed by the virtualization management system 140. In one implementation, the virtualization management system 140 manages the hosts 110, 120 by initializing and configuring virtualization in the hosts 110, 120 after completion of provision phase in the hosts 110, 120.

Figure 2:
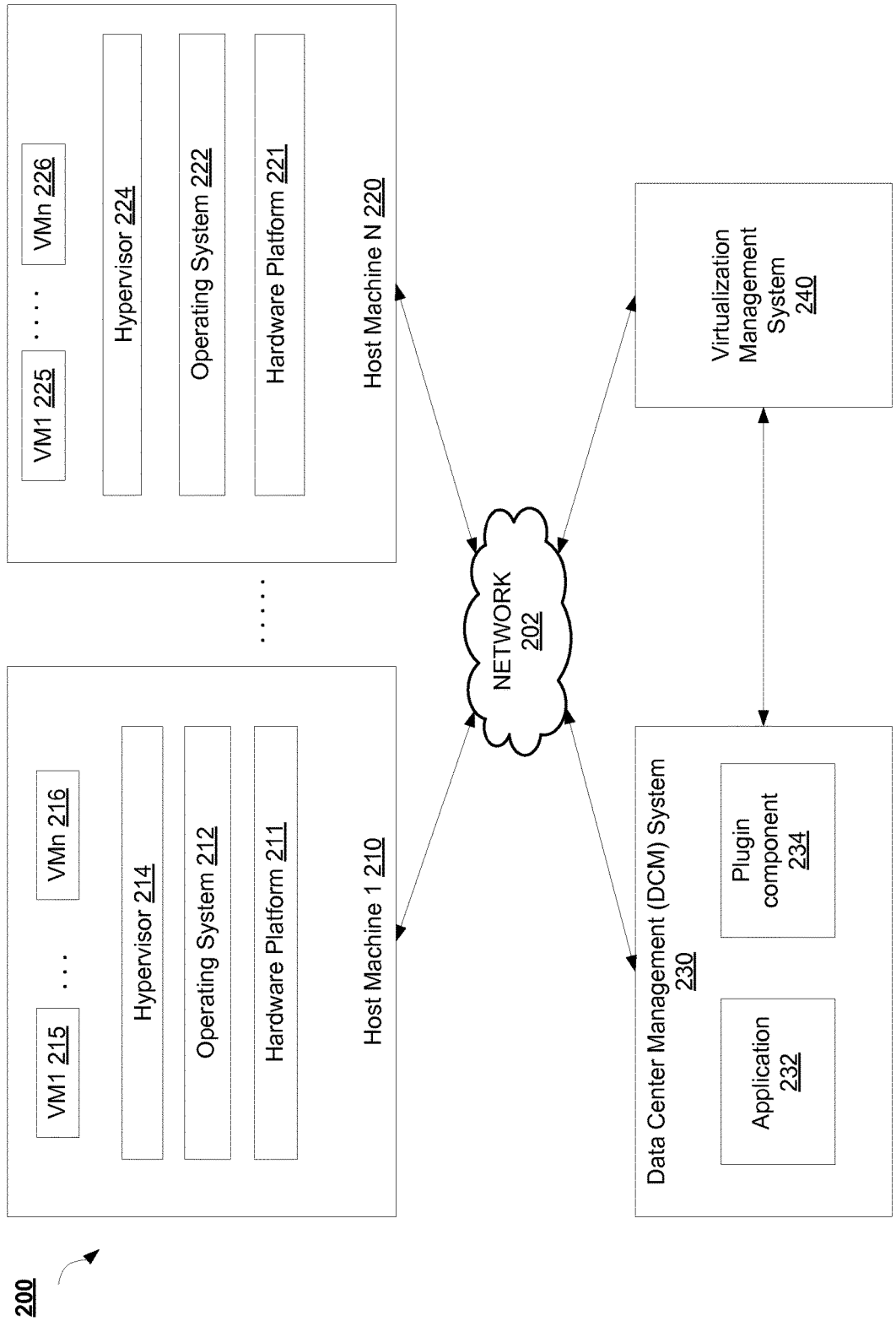
FIG. 2 is a block diagram of a network architecture in which a host machine is initialized to an operational hypervisor according to an implementation of the disclosure.

FIG. 2 is a block diagram of a network architecture 200 including a DCM system 230 and a virtualization management system 240 both coupled to the hosts 210 and 220 via a network 202. In one implementation, the DCM system 230 is same as the DCM system 130, the virtualization management system 240 is same as the virtualization management system 140, network 202 is same as the network 102, and hosts 210 and 220 are same as the hosts 110 and 120 respectively, as described with respect to FIG. 1. In one implementation, the DCM system 230 includes an application 232 and a plugin component 224, which are the same as the application 132 and the plugin component 134 of FIG. 1.

As discussed above, in one implementation, the DCM system 230 may include an application 232 to install and configure an operating system (OS) on each of the hosts 210, 220. This OS installed on hosts 210, 220 may be referred to herein as a host OS. In one implementation, the DCM system 230 installs a host OS 212, a host OS 222 on one or more of the hosts 210, 220. In one implementation, the DCM system 230 sends a first application programming interface (API) request to the application 232 to install the host OS 212, and host OS 222 on the hosts 210 and 220 respectively. Each of the hosts 210 and 220 boots up and sends its hardware information to the DCM system 230. The DCM system 230 maintains a list of these hosts 210 and 220 onto which the host OS 212 and 222 were installed. When the DCM system 230 receives the hardware information from each of the host 210 and 220, indicating that the host OS 212 and 222 have been completely and accurately installed on the hosts 210, 220, the DCM system 230 may then send a second API request to the application 232 to initiate configuration of files on the installed host OS 212 and 222 in the hosts 210, 220 respectively.

As discussed above, in one implementation, the plugin component 234 provides for correlation between the DCM system 230 and the virtualization management system 240. In one implementation, the plugin component 234 detects this second API request as a first attempt to provision the hosts 210, 220. Because of detecting the second API request, the plugin component 234 communicates with the virtualization management system 240. In one implementation, the plugin component 234 provides a list of the hosts 210 and 220 to the virtualization management system 240.

The virtualization management system 240 shows the list to a user. The user may select one or more of the hosts 210 and 220 and define a set of configurations for the selected hosts 210 and 220 to the virtualization management system 240. Such configuration may include but not limited to network configurations and services to be run by the selected hosts OS 210 and 220. The user may also provision a request to the DCM system 230 via the virtualization management system 240 to initialize the selected hosts 210 and 220 to a hypervisor with a defined set of configurations.

The virtualization management system 240 communicates with the plugin component 230 of the selected hosts 210 and 220 and the configurations associated with the selected hosts 210 and 220. The DCM system 230 then sends a second request to the application 232, which begins to configure the selected hosts 210, 220 based on the defined set of configurations provided by the the virtual management system 240. Accordingly, in the implementation of the present invention, the plugin component of the data center management system uses an application programming interface (API) of the virtualization management system to deploy the requirements on the host that got provisioned. The application 232 reports on status of the configuration of the selected hosts 210, 220 to the DCM system 230. Application 232 may report to the DCM system 230 on a continuous basis, or otherwise (e.g., interval reporting, etc.). In one implementation, the plugin component 234 monitors the status of configuration on the selected hosts 210 and 220 that are reported to the DCM system 230.

The DCM system 230 receives a final status from the application 232 that the OS of the selected hosts 210, 220 has been completely and accurately configured as per the set of configurations defined by the user In one implementation, this final status is detected by the plugin component 234, which subsequently informs the virtualization management system 240 of the final status. The virtualization management system 240 informs the user of the final status on the configuration of the selected hosts 210, 220. At this point, the user may use the selected hosts 210 and 220 from the virtualization management system 240 to initiate virtualization in the selected hosts 210, 220. As such, the plugin component 234 places the hosts 210, 220 in a state such that the hosts 210, 220 are managed by the virtualization management system 240. In one implementation, the virtualization management system 240 manages the hosts 210, 220 by initializing and configuring virtualization in the hosts 210, 220 after completion of provision phase in the hosts 210, 220.

The virtualization management system 240 deploys VMs 215, 216 and VMs 225, 226 on the hosts 210 and 220, respectively. As such, the plugin component 234 places the hosts 210, 220 in a state that the hosts 210, 220 are managed by the virtualization management system 240.

In one implementation, the virtualization management system 240 manages the hosts 210, 220 by initializing and configuring virtualization in the hosts 210, 220 after completion of the provision phase in the hosts 210, 220. In one implementation, the virtualization management system 240 deploys the hypervisor 214 into the host 210 to initiate creation and execution of the VM1 215 through VMn 216 in the host 210. Similarly, the virtualization management system 240 may deploy the hypervisor 224 into the host 220 to initiate creation and execution of the VM1 225 through VMn 226 in the host 220.

In one implementation, the hypervisor 214, 224 may emulate the underlying hardware platform 211, 221 of the host 210, 220 for the VMs 215, 216, 225, 226. The hypervisor 214, 224 may also be known as a virtual machine monitor (VMM) or a kernel-based hypervisor. In some implementations, the hypervisor 214, 224 is part of the host OS 212, 222 of the host 210, 220.

VMs 215, 216, 225, 226 can be, for example, hardware emulation, full virtualization, para-virtualization, and operating system-level virtualization VMs. Each VM 215, 216, 225, 226 includes a guest OS that may be different from one VM 215, 216, 225, 226 to another VM 215, 216, 225, 226. The guest OS may include Microsoft Windows™, Linux™ Solaris™, Mac™ OS, and so on. The guest OS may host one or more applications within the VM 215, 216, 225, 226. Moreover, the guest OSes and the host OS 212, 222 may share the same OS type, or the host OS 212, 222 may be a different type of OS than guest OSes.

In one implementation, the virtualization management system 240 manages the VMs 215, 216 in the host 210 and manages the VMs 225, 226 in the host 220. The virtualization management system 240 may monitor and control VMs 215, 216, 225, 226 running on hosts 210, 220. The virtualization management system 240 may manage one or more of provisioning new VMs, connection protocols between clients (not shown) and VMs 215, 216, 225, 226, user sessions (e.g., user authentication and verification, etc.), backup and restore, image management, VM migration, load balancing, network provisioning, storage provisioning. The virtualization management system 240 may also configure hosts, configure data centers, add a VM, delete a VM, balance load on a cluster of hosts, provide directory service to the VMs, add storage, define networks, create virtual machines, manage user permission, use templates from the management system (e.g., VM templates that are used for creating new VMs with predefined settings and preinstalled disk images), and perform other management functions.

Figure 3:
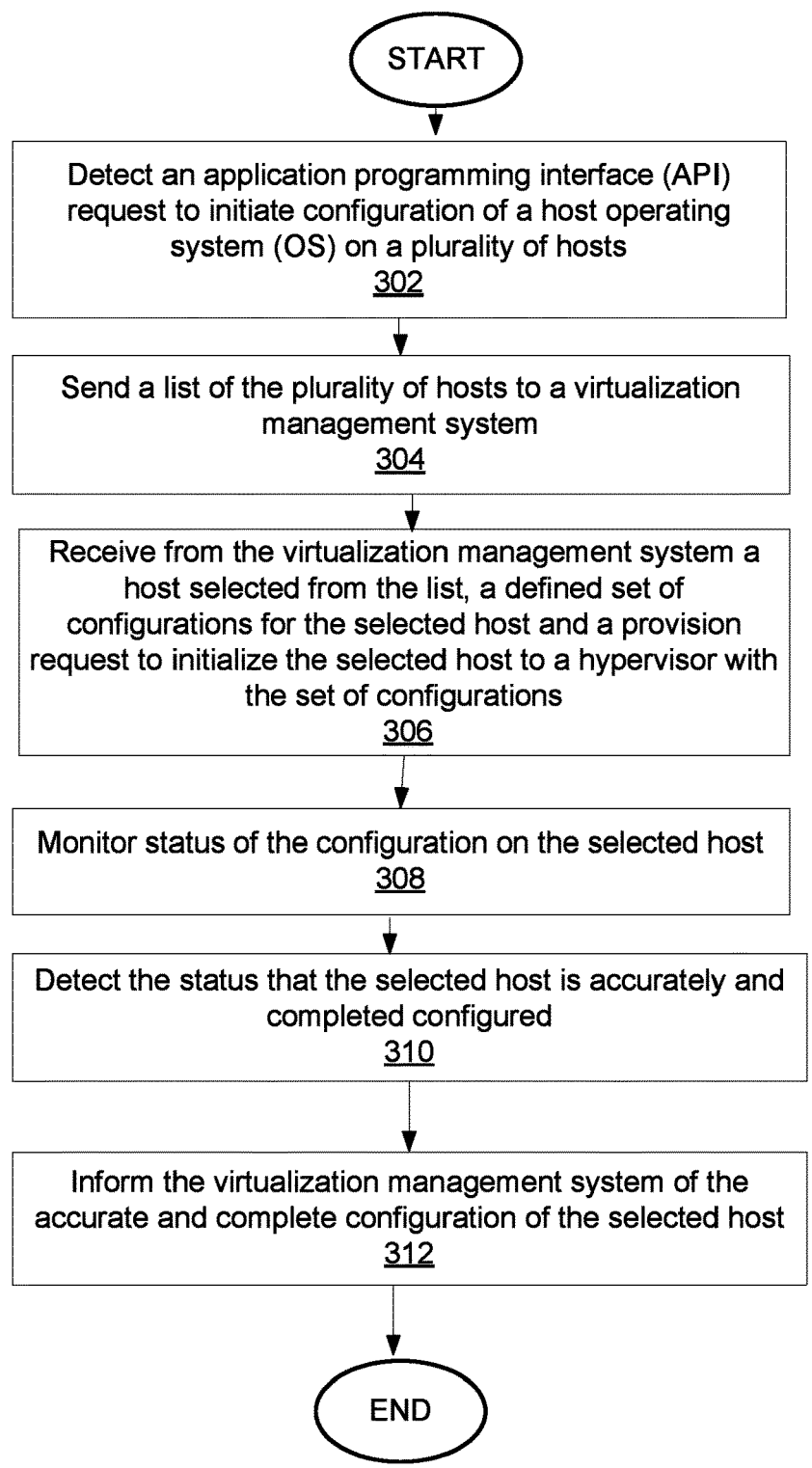
FIG. 3 is a flow diagram illustrating a method for initializing a host machine to an operational hypervisor according to an implementation of the disclosure.

FIG. 3 is a flow diagram illustrating a method 300 for initializing a bare metal host to an operational hypervisor according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by plugin component 124 and 224 of FIGS. 1 and 2.

Method 300 begins at block 302, where an API request to initiate configuration of a host OS installed in a plurality of hosts is detected. In one implementation, this API request is a first attempt to provision the host. In one implementation, the host OS is installed on the bare-metal host (a.k.a. host). Each of the plurality of hosts boots up and sends its hardware information to a data center management system (DCM), which maintains a list of the plurality of hosts onto which the host OS are installed. Subsequently, at block 304, a list of the plurality of hosts is provided to a virtualization management system. At block 306, a host selected from the list, a defined set of configurations for the selected host and a provision request to initialize the selected host to a hypervisor with the set of configurations are received from the virtualization management system. In one implementation, the virtualization management system shows the list to a user, who selects the host from the list and defines a set of configurations for the selected host to the virtualization management system. Such configuration may include but not limited to network configurations and services to be run by the selected host. The user may also provision the request to the virtualization management system to initialize the selected host to the hypervisor with the set of configurations. Accordingly, in the implementation of the present invention, the plugin component uses an application programming interface (API) of the virtualization management system to deploy the requirements on the host that got provisioned.

At block 308, status of the configuration on the selected hosts is monitored. In one implementation, the status is monitored in a continuous manner. At block 310, a status indicating that the selected host is completely and accurately configured is detected. In one embodiment, the selected host is completely and accurately configured based on the defined set of configurations. Subsequently, at block 312, inform the virtualization management system of the complete and accurate configuration of the selected host. At this point, the user may use the selected from the virtualization management system to initiate virtualization in the selected host. As such, the host is placed in a state that the host is managed by the virtualization management system. In one implementation, the virtualization management system manages the hosts by initializing and configuring virtualization in the host after completion of a provision phase in the hosts.

Figure 4:
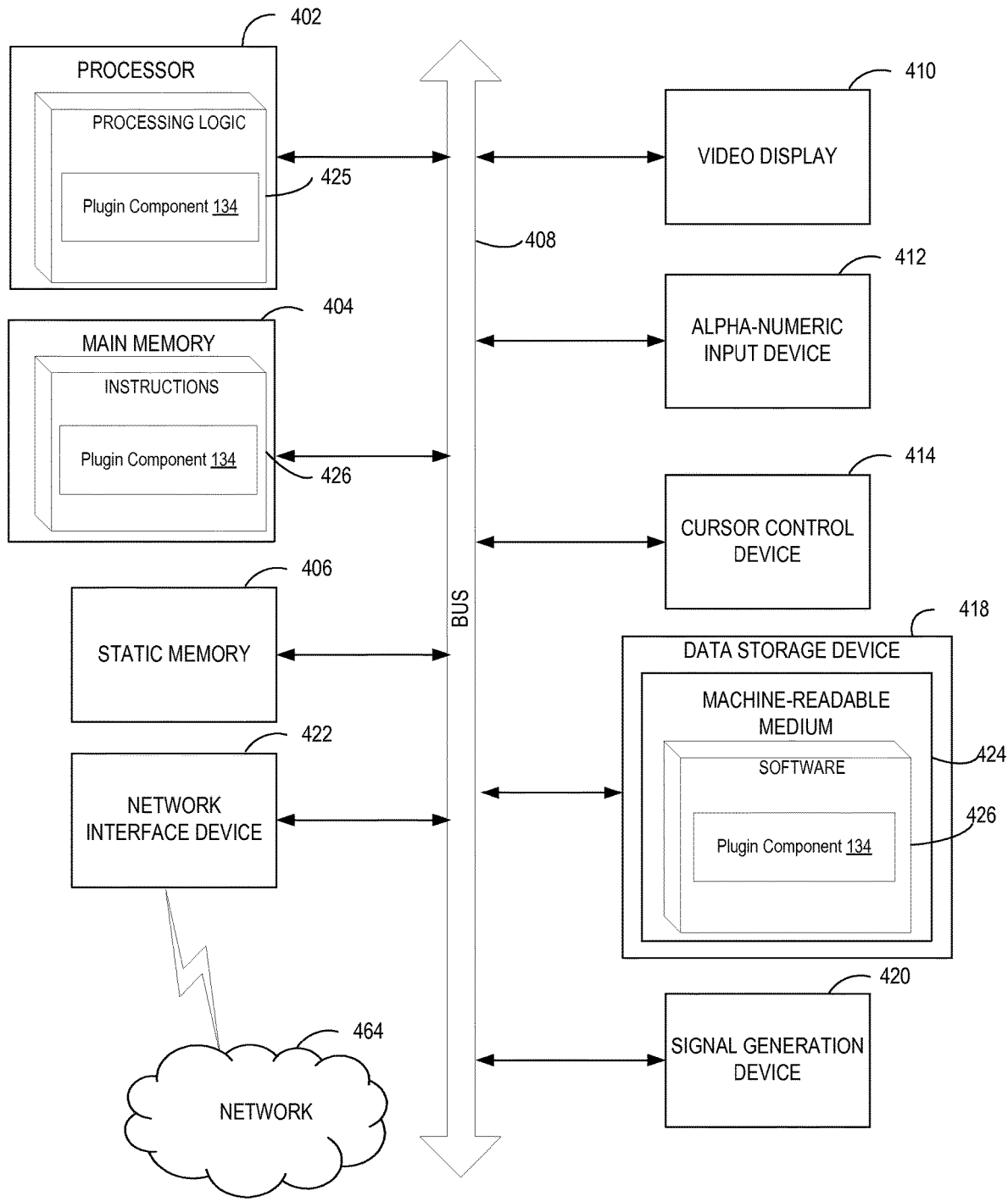
FIG. 4 illustrates a block diagram of one implementation of a computer system.

FIG. 4 illustrates a diagrammatic representation of a machine in the example form of a computer system 400 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 400 includes a processing device 402 (e.g., processor, CPU, etc.), a main memory 404 (e.g., read-only memory (ROM), flash memory, dynamic random access memory (DRAM) (such as synchronous DRAM (SDRAM) or DRAM (RDRAM), etc.), a static memory 406 (e.g., flash memory, static random access memory (SRAM), etc.), and a data storage device 418, which communicate with each other via a bus 408.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 422 communicably coupled to a network 464. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 418 may include a machine-accessible storage medium 424 on which is stored software 426 embodying any one or more of the methodologies of functions described herein. The software 426 may also reside, completely or at least partially, within the main memory 404 as instructions 426 and/or within the processing device 402 as processing logic 426 during execution thereof by the computer system 400; the main memory 404 and the processing device 402 also constituting machine-accessible storage media.

The machine-readable storage medium 424 may also be used to store instructions 426 to implement a plugin component 134 to implement initializing bare metal host to an operational hypervisor, such as the plugin component 134 described with respect to FIG. 1, and/or a software library containing methods that call the above applications. While the machine-accessible storage medium 424 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "checking", "detecting", "monitoring", "determining", "providing", "deploying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
    detecting, by a processing device of a data center management (DCM) system, a request to initiate configuration of a host operating system (OS) installed on a plurality of bare-metal hosts, wherein the DCM manages installing and configuration OSes on the plurality of bare-metal hosts and maintains a list of the plurality of bare-metal hosts onto which the host OS is installed, and wherein the DCM is separate from a virtualization management system that manages virtualization on the plurality of bare-metal hosts;
    receiving, by the processing device of the DCM system, a selection of a host from the list of the plurality of bare-metal hosts, a defined set of configurations for the host OS, and a provision request to initiate the selected host OS with the defined set of configurations on the selected host;
    initiating, by the processing device of the DCM system, a configuration of the OS in accordance with the defined set of configurations on the selected host;
    monitoring, by the processing device of the DCM system, for a status of the configuration of the host OS; and
    responsive to determining that the status indicates that the configuration of the host OS is complete, transferring management of the selected host from the DCM system to the virtualization management system by the processing device of the DCM system performing:
        notifying, by the processing device of the DCM system, the virtualization management system of the status of the configuration of the host OS; and
        causing, by the processing device of the DCM system via an application programming interface (API) of the virtualization management system, the virtualization management system to initiate deployment of a hypervisor on the host OS by the virtualization management system, wherein deployment of the hypervisor on the selected host is to cause the hypervisor to initiate and execute one or more virtual machines (VMs) on the selected host.

2. The method of claim 1, wherein detecting the request comprises detecting a plurality of application programming interface (API) requests, wherein one of the requests comprises an initial attempt to provision the host.

3. The method of claim 1, wherein the status indicates a complete and accurate configuration of the host operating system.

4. The method of claim 3, further comprising initializing and configuring virtualization on the host by the virtualization management system upon receipt of the status comprising the complete and accurate configuration of the host operating system.

5. The method of claim 4, further comprising:
    sending a list comprising the bare-metal hosts to the virtualization management system; and
    receiving the selection of the host from the virtualization management system.

6. The method of claim 5, further comprising detecting the status of a complete and accurate configuration of the selected host.

7. The method of claim 1, wherein the configuration is provided by a user.

8. A system comprising:
    a memory; and
    a processing device of a data center management (DCM) system, operatively coupled to the memory, to:
        detect a request to initiate configuration of a host operating system (OS) installed on a plurality of bare-metal hosts, wherein the DCM manages installing and configuration OSes on the plurality of bare-metal hosts and maintains a list of the plurality of bare-metal hosts onto which the host OS is installed, and wherein the DCM is separate from a virtualization management system that manages virtualization on the plurality of bare-metal hosts;
        receive a selection of a host from the list of the plurality of bare-metal hosts, a defined set of configurations for the host OS, and a provision request to initiate the selected host OS with the defined set of configurations on the selected host;

initiate a configuration of the OS in accordance with the defined set of configurations on the selected host;

monitor for a status of the configuration of the host OS; and responsive to determining that the status indicates that the configuration of the host OS is complete, transfer management of the selected host from the DCM system to the virtualization management system by the processing device of the DCM system performing:

notify the virtualization management system of the status of the configuration of the host OS; and cause, via an application programming interface (API) of the virtualization management system, the virtualization management system to initiate deployment of a hypervisor on the host OS by the virtualization management system, wherein deployment of the hypervisor on the selected host is to cause the hypervisor to initiate and execute one or more virtual machines (VMs) on the selected host.

9. The system of claim 8, wherein to detect the request the processing device is to detect a plurality of application programing interface (API) requests, wherein one of the requests comprises an initial attempt to provision the host.

10. The system of claim 8, wherein the status comprises a complete and accurate configuration of the installed host operating system.

11. The system of claim 10, wherein the virtualization management system is further to initialize and configure virtualization on the host upon receipt of the status comprising the complete and accurate configuration of the host operating system.

12. The system of claim 11, wherein the processing device to:

send a list comprising the bare-metal hosts to the virtualization management system; and receive a selection of the host from the virtualization management system.

13. The system of claim 12, wherein the processing device to detect the status of a complete and accurate configuration of the selected host.

14. The system of claim 8, wherein the defined configuration is provided by a user.

15. A non-transitory computer-readable storage medium embodying instructions that, when executed by a processing device, cause the processing device to:

detect, by the processing device of a data center management (DCM) system, a request to initiate configuration of a host operating system (OS) installed on a plurality of bare-metal hosts, wherein the DCM manages installing and configuration OSes on the plurality of bare-metal hosts and maintains a list of the plurality of bare-metal hosts onto which the host OS is installed, and wherein the DCM is separate from a virtualization management system that manages virtualization on the plurality of bare-metal hosts;

receive, by the processing device of the DCM system, a selection of a host from the list of the plurality of bare-metal hosts, a defined set of configurations for the host OS, and a provision request to initiate the selected host OS with the defined set of configurations on the selected host;

initiate, by the processing device of the DCM system, a configuration of the OS in accordance with the defined set of configurations on the selected host;

monitor, by the processing device of the DCM system, for a status of the configuration of the host OS; and responsive to determining that the status indicates that the configuration of the host OS is complete, transferring management of the selected host from the DCM system to the virtualization management system by the processing device of the DCM system performing:

notify, by the processing device of the DCM system, the virtualization management system of the status of the configuration of the host OS; and cause, by the processing device of the DCM system via an application programming interface (API) of the virtualization management system, the virtualization management system to initiate deployment of a hypervisor on the host OS by the virtualization management system, wherein deployment of the hypervisor on the selected host is to cause the hypervisor to initiate and execute one or more virtual machines (VMs) on the selected host.

16. The non-transitory computer-readable storage medium of claim 15, wherein the processing device to detect the request comprises the processing device to detect a plurality of application programming interface (API) requests, wherein one of the requests comprises an initial attempt to provision the host.

17. The non-transitory computer-readable storage medium of claim 15, wherein the status indicates a complete and accurate configuration of the host operating system.

18. The non-transitory computer-readable storage medium of claim 17, wherein the virtualization management system is further to initialize and configure virtualization on the host upon receipt of the status comprising the complete and accurate configuration of the installed host operating system.

19. The non-transitory computer-readable storage medium of claim 18, wherein the processing device to:

send a list comprising the bare-metal hosts to the virtualization management system; and receive the selection of the host from the virtualization management system.

20. The non-transitory computer-readable storage medium of claim 19, wherein the processing device to detect the status of a complete and accurate configuration of the selected host.

* * * * *